3,206,413
IRON REMOVAL IN A PLATINUM RECOVERY
PROCESS
James G. Leopard, Shreveport, La., assignor to Universal Oil Products Company, Des Plaines, Ill., a corporation of Delaware
No Drawing. Filed Nov. 23, 1962, Ser. No. 239,772
4 Claims. (Cl. 252—411)

The present invention relates to the recovery of platinum-group metallic components from a variety of composites thereof. More specifically, the present invention is directed toward an improvement in the method for recovering platinum from carbonized, deactivated catalytic composites containing platinum in combination with one or more refractory inorganic oxides, as well as other catalytic components.

Catalytic composites of a refractory inorganic oxide and at least one metallic component selected from the group consisting of the metals and compounds of the platinum-group of the Periodic Table, are extensively employed throughout commercial industries for promoting a multitude of reactions including cyclization, hydrogenation, dehydrogenation, isomerization, aromatization, dehydrocyclization, hydrocracking, etc. Following a prolonged period of use in serving its intended function, these catalytic composites generally become deactivated and incapable of further acceptable performance. Catalyst deactivation may result from deleterious substances which are peculiar to the particular catalyst employed, a change in the physical state of the catalytic components, a loss of said components, or from the deposition of impurities, generally in the form of solids, which shield the catalytically-active surfaces and centers from the materials being processed. The deposition of coke and other heavy hydrocarbonaceous material is a direct cause of catalytic deactivation, and often occurs in combination with one of the previously mentioned causes of catalyst deactivation.

The coke and other hydrocarbonaceous material is readily removed from the catalytic composite by burning the deactivated catalyst in a free oxygen-containing medium, such as air, which, to all appearances has the effect of producing an active catalyst. Other, more recent methods employed in conjunction with the air-oxidation, or burning of the deactivated catalyst, are utilized to revert the catalytic components to their most active state, thereby producing catalysts which are nearly identical in composition and activity to the catalyst prior to use. It is found, however, that each regeneration results in a catalyst of somewhat lower activity than the catalyst prior to use, and which regenerated catalyst functions acceptably for a shorter period of time than that catalyst resulting from the preceding regeneration. Eventually it becomes necessary to replace the catalyst with a new, unused portion of catalyst, further regeneration not being economically justifiable. The high cost of the platinum-group metal component does not permit discarding the deactivated catalytic composite per se, notwithstanding the relatively minor concentration of the platinum-group metal in comparison to the concentration of the other components. The present invention is directed toward an improvement in processes designed to recover platinum-group metals from deactivated catalytic composites which can no longer be regenerated economically.

Although the method of the present invention is specifically directed toward the recovery of platinum from carbonized, deactivated platinum-containing catalytic composites, it is understood that the method may be advantageously employed to improve processes designed to recover other platinum-group metals including iridium, osmium, palladium, ruthenium, and rhodium, and mixtures thereof. These metals are generally composited with a refractory inorganic oxide including alumina, zirconia, silica, hafnia, boria, magnesia, thoria, etc., and mixtures of two or more, such as silica-alumina, silica-zirconia, silica-alumina-zirconia, etc. Other catalytic components may be composited with the refractory inorganic oxide and the platinum-group metallic component, for the purpose of imparting certain desired physical and/or chemical characteristics to the catalyst. Such other components include metals such as tungsten, sodium, nickel, cobalt, molybdenum, chromium, mixtures of the same, etc. and members of the halogen family, particularly chlorine and/or fluorine. Similarly, the metallic components may exist as sulfides, nitrates, oxides, in the elemental state, or in some combined, complex form with the other components of the catalyst. In any event, the catalytic composite, when deactivated and no longer capable of serving its intended function, contains excessive quantities of coke and other hydrocarbonaceous material. In addition, the deactivated catalyst is contaminated through the presence of metallic impurities such as lead, antimony, iron, copper, various compounds thereof, etc. These metallic contaminants interfere with the efficient, economical recovery of the platinum-group metal, the presence of iron and compounds thereof creating particular difficulties. Furthermore, the continued presence of these contaminants precludes the use of the refractory oxide derived from the carrier material.

Most present-day methods for the recovery of the platinum-group metallic component include the step of treating the catalytic composite with a suitable strong acid or alkali to dissolve the refractory inorganic oxide, and to free the platinum-group metal in some finely divided or colloidal state, or, conversely, to dissolve the platinum-group metal leaving the refractory inorganic oxide in the form of a residue. In any event, the tendency of the metallic contaminants, and particularly iron, is to follow the path taken by the platinum-group metal and remain therewith throughout the recovery process. In view of the relatively small percentages of platinum-group metals employed in the field of catalysis, the continuing presence of these impurities adversely affects the desired catalytic action. It is, therefore, an important requirement that the platinum-group metal be recovered either in a substantially pure state as the element, or as an equally pure compound thereof. The object of the present invention is to provide a method by which the adverse influence of metallic impurities, and particularly iron, is eliminated during an early stage of a process for recovering a platinum-group metallic component from a catalytic composite thereof. A particular object is to provide a method of eliminating the difficulties arising as a result of the presence of iron, which method is neither tedious and involved, nor prohibitively expensive.

In a broad embodiment, therefore, the present invention involves a method for removing iron from a carbonized composite of a refractory inorganic oxide and a metallic component selected from the platinum-group of the Periodic Table, which method comprises oxidizing said composite in a free oxygen-containing atmosphere, and at oxidizing conditions selected to form carbon monoxide, lowering the temperature of the oxidized composite and treating the same with carbon monoxide at the lower temperature to form iron carbonyl, removing said carbonyl from said composite and recovering the latter substantially iron-free.

A more limited embodiment of the present invention is directed toward a method of removing iron from a carbonized composite of a refractory inorganic oxide and a metallic component selected from the platinum-group of the Periodic Table, which method comprises oxidizing said composite in an oxidizing atmosphere containing free oxygen and from about 65% to about 85% of carbon monoxide, at a temperature within the range of from about 625° C. to about 675° C. to form additional carbon monoxide, lowering the temperature of the oxidized composite to a level within the range of from about 175° C. to about 225° C. and treating with carbon monoxide at said lower temperature to form iron carbonyl, removing said carbonyl from said composite and recovering the latter substantially iron-free.

From the foregoing embodiments, it is noted that the present method utilizes an oxidizing treatment in a free oxygen-containing atmosphere for the purpose of removing coke and other heavy hydrocarbonaceous material from the deactivated catalytic composite. It is recognized that the prior art is replete with ways and means of removing the carbonaceous material by a high-temperature oxidation technique. In general, these methods utilize a free oxygen-containing gaseous atmosphere at temperatures within the range of about 400° C. to about 900° C., or higher. In this manner, the coke and other carbonaceous material is converted into carbon dioxide, a minor proportion of carbon monoxide, and normally gaseous light hydrocarbons including methane, ethane, and propane, all of which are removed from the composite in a gaseous phase. Since such methods do not successfully reduce the concentration of metallic contaminants, and particularly iron, subsequent techniques in the overall recovery procedure become tedious and expensive. In fact, any iron which is present on the carbonized composite is converted to iron oxide, the subsequent removal of which is extremely difficult and arduous. In accordance with the method of the present invention, the high-temperature oxidation is conducted within a limited temperature range, such that iron oxide is reduced to the elemental metal and/or prohibited from forming. Thus, the oxidation of the carbonized composite is conducted at temperatures within the range of about 625° C. to about 675° C., with a limited concentration of free oxygen such that carbon monoxide is selectively formed, and the conversion to carbon dioxide is maintained at an absolute minimum. The particularly preferred mode of conducting the oxidation, or burning of the catalytic composite is to utilize an atmosphere containing from about 65% to about 85% of carbon monoxide in order to reduce iron oxide to elemental iron, and to decrease the tendency for iron oxide to be formed. Substantially complete reduction of iron oxides will be obtained utilizing oxidizing atmospheres consisting of about 20% of air and about 80% of carbon monoxide.

At such time as the catalytic composite is substantially completely free from coke and other carbonaceous material, and the iron contained therein is completely reduced, the temperature of the oxidized composite is lowered to a level within the range of about 175° C. to about 225° C. The oxidized composite is treated with carbon monoxide at the lower temperature, preferably in a suitable enclosed vessel through which the carbon monoxide is passed in upward or downward flow. As the carbon monoxide passes through the oxidized composite, at temperatures within the foregoing range, iron carbonyl is formed and is removed from the oxidized composite in the excess carbon monoxide stream. It appears that elevated pressures, up to about 5000 pounds per square inch gauge, facilitate the removal of iron through the formation of the carbonyl. The effluent gas is cooled to about atmospheric temperature, at which at least a portion of the iron carbonyl is condensed and may be readily removed. It is preferred, however, to pass the effluent gaseous mixture of carbon monoxide and iron carbonyl through a scrubber counter-currently to a flowing stream of kerosene or naphtha in which the iron carbonyl is extremely soluble. The residual carbon monoxide may be recycled through the oxidized composite until such time as the effluent gas indicates an absence of iron carbonyl. The oxidized composite may then be subjected to dissolution in either strong acid or strong alkali, as hereinbefore set forth, without ultimately experiencing the adverse effects otherwise resulting from the presence of iron at this and further stages of the recovery process.

Briefly, it may be stated that the method of the present invention comprises two distinct stages or steps. The first involves the removal of coke and other carbonaceous material in an oxidizing atmosphere, and under such conditions that carbon monoxide is preferentially formed, rather than in admixture with a major proportion of carbon dioxide, and various iron oxides are reduced to the metallic state. As hereinbefore set forth, a suitable oxidizing atmosphere comprises about 20% of air and about 80% of carbon monoxide, and such oxidizing atmosphere may be recirculated through a suitable vessel containing the carbonized catalytic composite. The effluent gas from this oxidizing technique, containing the additional carbon monoxide formed from the carbonaceous material, may be utilized in the second stage for the purpose of forming the iron carbonyl. Thus, the carbon monoxide-containing streams from both the first and second stages may be passed into the same condenser and/or scrubber, the desired quantity being recycled to each of the first and second stages. In addition to a kerosene or naphtha scrubber, employed for the removal of iron carbonyl, it is preferred to employ a scrubber containing caustic material having the propensity for absorbing residual quantities of carbon dioxide. If carbon dioxide is present in either the oxidizing stage or the carbonyl-forming stage, an acceptable degree of iron decontamination of the catalytic composite is not experienced.

*Example*

A commercially deactivated catalytic composite of alumina, platinum and combined halogen from the group of chlorine and fluorine, containing about 12.5% by weight of carbonaceous material, calculated as carbon, is placed in an enclosed vessel having inlet and outlet connections. The composite is heated to a temperature of about 650° C. and contacted within the vessel with an oxidizing atmosphere consisting of 20% air and 80% carbon monoxide. When the removal of carbonaceous material is complete, for example to a level below about 0.5% by weight of the total composite, the temperature of the thus-oxidized composite is lowered to a level of about 200° C., and a stream of carbon monoxide is passed therethrough. The effluent gases, containing iron carbonyl and carbon monoxide is passed into a suitable separator maintained at about room temperature, in which at least a portion of the iron carbonyl condenses. The remaining gaseous portion is passed through a scrubber containing kerosene and the iron carbonyl-free carbon monoxide effluent is recycled to combine with either the fresh carbon monoxide passing through the oxidized composite, or to combine with the free oxygen-containing oxidizing atmosphere.

Upon analysis, the platinum-aluminum composite is found to contain less than about 0.3% by weight of coke and carbonaceous material, calculated as carbon, and less than about 0.01% by weight of iron.

The applicability of the method of the present invention, for the removal of iron from a catalytic composite, from which a platinum-group metallic component is to be ultimately recovered, will be readily recognized by those possessing skill within the art. The method itself is economically advantageous, and affords a relatively simple expediency by which the difficulties otherwise resulting from the presence of metallic contaminants, and particularly iron, are not experienced in the subsequent recovery techniques.

I claim as my invention:

1. A method for removing iron oxide from a carbonized composite of a refractory inorganic oxide and a metallic component from the platinum-group of the Periodic Table, which comprises contacting said composite with an oxidizing gas containing free oxygen and from about 65% to about 85% of carbon monoxide, at a temperature within the range of from 625° C. to about 675° C. to oxidize carbonaceous material and to reduce the iron oxide to elemental iron, lowering the temperature of the thus treated composite to a level within the range of from about 175° C. to about 225° C., then contacting the composite with a stream of carbon monoxide at said lower temperature to convert the elemental iron to iron carbonyl vapor, removing said carbonyl vapor in the carbon monoxide stream, and recovering the resultant substantially iron-free composite.

2. The method of claim 1 further characterized in that said platinum-group metallic component is platinum.

3. The method of claim 1 further characterized in that said platinum-group metallic component is palladium.

4. The method of claim 1 further characterized in that said carbonized composite comprises platinum and alumina.

References Cited by the Examiner

UNITED STATES PATENTS

| | | | |
|---|---|---|---|
| 2,276,921 | 3/42 | Brown | 252—411 |
| 2,641,582 | 6/53 | Haensel | 252—416 |

OTHER REFERENCES

Partington: "A Textbook of Inorganic Chemistry," 6th edition, Macmillan and Co. Ltd., London, 1950, pages 627–629.

MAURICE A. BRINDISI, *Primary Examiner.*